(12) United States Patent
Hartmann et al.

(10) Patent No.: US 11,627,232 B2
(45) Date of Patent: Apr. 11, 2023

(54) DIGITAL MOTION PICTURE CAMERA

(71) Applicant: Arnold & Richter Cine Technik GmbH & Co. Betriebs KG, Munich (DE)

(72) Inventors: Lars Hartmann, Munich (DE); David Zucker, Munich (DE)

(73) Assignee: Arnold & Richter Cine Technik GmbH & Co. Betriebs KG, Munich (DE)

( * ) Notice: Subject to any disclaimer, the term of this patent is extended or adjusted under 35 U.S.C. 154(b) by 0 days.

(21) Appl. No.: 16/952,392

(22) Filed: Nov. 19, 2020

(65) Prior Publication Data

US 2021/0185189 A1    Jun. 17, 2021

(30) Foreign Application Priority Data

Dec. 11, 2019   (DE) .......................... 102019134009.8

(51) Int. Cl.
  *H04N 1/21*         (2006.01)
  *H04N 5/77*         (2006.01)
(52) U.S. Cl.
  CPC ........... *H04N 1/212* (2013.01); *H04N 1/2129* (2013.01); *H04N 5/772* (2013.01)
(58) Field of Classification Search
  CPC ...... H04N 1/212; H04N 5/772; H04N 1/2129; H04N 5/222; H04N 5/91; H04N 5/225; H04N 1/21; H04N 5/77; G11B 27/3081

(Continued)

(56) References Cited

U.S. PATENT DOCUMENTS 6,161,933 A    12/2000   Tschida et al.
8,483,511 B1    7/2013   Foulds et al.
(Continued)

FOREIGN PATENT DOCUMENTS

DE         19629484 A1    1/1998
JP       2012100216 A     5/2012
WO       2010046237 A1    4/2010

OTHER PUBLICATIONS

Search Report dated May 12, 2021 in connection with European Patent Application No. 20208814.2.

(Continued)

*Primary Examiner* — Thai Q Tran
*Assistant Examiner* — Nienru Yang
(74) *Attorney, Agent, or Firm* — Amster, Rothstein & Ebenstein LLP

(57) ABSTRACT

In a digital motion picture camera comprising an electronic image sensor for generating image signals, a control unit is configured, in response to a scene record command, to generate a sequence data stream, which represents a sequence of consecutive frames, from the image signals of the image sensor and to transmit the sequence data stream to a sequence memory device. The control unit is configured, in response to an identification image record command, to generate an identification image data set, which represents at least one scene identification image, from the image signals of the image sensor and to buffer the identification image data set in a buffer memory, with the control unit further being configured to insert the buffered identification image data set into a subsequently generated sequence data stream such that the sequence of consecutive frames is preceded by the scene identification image.

14 Claims, 1 Drawing Sheet

Figure 1:
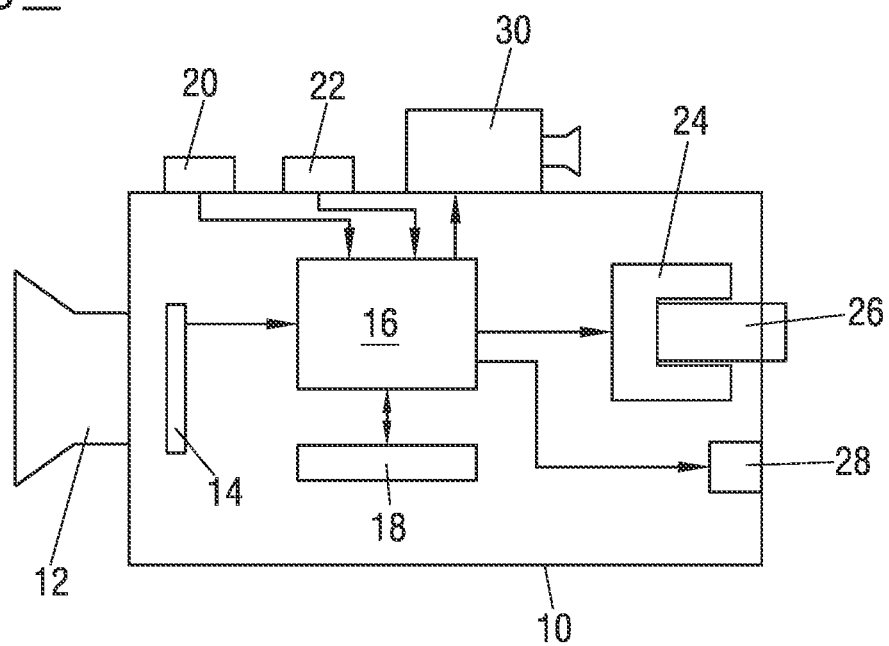

(58) Field of Classification Search
USPC .......................................................... 386/224
See application file for complete search history.

(56) References Cited

U.S. PATENT DOCUMENTS

| | | | |
|---|---|---|---|
| 2006/0125928 A1* | 6/2006 | Wolcott | H04N 5/225 |
| | | | 348/211.2 |
| 2010/0042650 A1 | 2/2010 | Roenning et al. | |
| 2012/0019702 A1 | 1/2012 | Richter | |
| 2013/0002896 A1* | 1/2013 | Fukushima | H04N 5/23245 |
| | | | 348/220.1 |
| 2013/0265455 A1* | 10/2013 | Shin | H04N 5/23203 |
| | | | 348/211.4 |
| 2019/0065857 A1 | 2/2019 | Takashima | |

OTHER PUBLICATIONS

German Communication dated Sep. 28, 2020 in connection with German Application No. 102019134009.8.

* cited by examiner

DIGITAL MOTION PICTURE CAMERA

The present invention relates to a digital motion picture camera comprising an electronic image sensor for generating image signals; and a control unit, wherein the control unit is configured, in response to a scene record command, to generate a sequence data stream, which represents a sequence of consecutive frames, from the image signals of the image sensor and to transmit the sequence data stream to a sequence memory device in order to store the sequence data stream.

The image sensor of such a motion picture camera generates the image signals in dependence on incident light. The image sensor may have a two-dimensional matrix of light-sensitive sensor elements, in particular having a color filter arrangement, for example in accordance with the Bayer pattern (RGGB). The motion picture camera may have an integrated objective (lens), which images a scene on the image sensor, or an objective mount for fastening an interchangeable objective. Said frames may, for example, be respective full frames or half-frames that only include a complete image content together with other half-frames.

In cinematographic productions (also designated as film productions), a large number of motion picture sequences and generally also of associated sound sequences are first recorded, wherein a selection, a processing, and a structuring of the recorded image material and sound material take place as part of a post-production in order to give the produced film its final form. This post-processing is also designated as film editing or synonymously as film montage, montage, or editing.

To carry out the film editing, it is necessary to already mark the different recorded motion picture sequences during the recording in such a way that they can be identified without problem during the later post-processing.

A so-called clapperboard is frequently used to mark a motion picture sequence. Traditional clapperboards comprise a slate that can be marked with the identification information to be recorded. Furthermore, a clapperboard has two bars that can be struck together to produce a striking sound. Since image and sound are often recorded by separate devices in film productions, a clear reference point or a sync mark is required for the film editing in order to couple the sound to the image sequence at the correct point. This reference point is set in the image and in the sound with the aid of the clapperboard. It is located there, where the bars of the clapper are closed in the image and the striking sound can be heard in the sound. Electronic clapperboards are also common in which the information and/or a time code can be displayed by means of an electronic display apparatus, for example by means of LED digits.

If the image and sound sequences are not recorded by separate devices or the sound is not recorded at all, an optical-acoustic clap signal is not required. In this case, the identification information is written on a simple slate that is recorded by the motion picture camera.

As a rule, to record a marked motion picture sequence, a recording operation of the motion picture camera is first activated, in which a sequence data stream is generated from the image signals of the image sensor, and a clapperboard or a slate is held in the recording region (field of view) detected by the camera and is actuated, if necessary. The clapperboard or the slate is subsequently removed again so that the camera can now record the actual motion picture sequence, wherein the camera remains continuously activated.

However, this approach is not practical in certain situations. When telephoto lenses are used, in the case of macro shots or when a camera is mounted on a crane, it is frequently not possible to first capture the clapperboard and subsequently the scene in a continuous manner. In such situations, it has proven to be useful to first capture a short motion picture sequence that only records the clapperboard, which is also designated as a "pre-filming" of the clapperboard. The camera is subsequently moved into the actual recording position for recording the scene and the settings of the camera (e.g. focal position, focal length) are adjusted, if necessary. The camera is paused or deactivated between the recording of the clapperboard and of the actual motion picture sequence to perform the necessary setting processes, assembly processes, and alignment processes.

This approach has proven itself with analog motion picture cameras that record the frame sequences in a linear manner on a photochemical film roll. However, this practice can no longer be sensibly applied in the case of digital motion picture cameras. Sequence memory devices for digital cameras record in a non-linear manner so that a separate motion picture clip (clip) has to be created for each motion picture sequence. In the practice of "pre-filming" described above, a digital motion picture camera first creates a first clip that includes a shot of the clapperboard or of the slate, while the actual scene is recorded in a second clip. However, the second clip corresponds to a separate data packet and does not have a direct connection to the first clip. Therefore, the problem of a quick and clear identification of the respective film material still exists.

It is an object of the invention to provide a digital motion picture camera that enables a better association between a recorded scene and an identification of the recorded scene, in particular in the form of a recorded clapperboard or of the slate.

This object takes place by a digital motion picture camera having the features of claim 1.

In the digital motion picture camera in accordance with the invention, the control unit is configured, in response to an identification image record command, to generate an identification image data set, which represents at least one scene identification image, from the image signals of the image sensor and to buffer the identification image data set in a buffer memory. Thereafter, the control unit is furthermore configured, in response to a scene record command, to generate a sequence data stream, which represents a sequence of consecutive frames (that is a motion picture sequence), from the image signals of the image sensor and to transmit the sequence data stream to a sequence memory device in order to store the sequence data stream. The control unit is further configured to insert the buffered identification image data set into the subsequently generated sequence data stream such that, in the representation of the sequence data stream, the sequence of consecutive frames is preceded by the scene identification image and the sequence data stream, including the inserted identification image data set, forms a closed data stream that is transmitted to the sequence memory device.

In other words, the generation and buffering of the identification image data set take place in response to the identification image record command in a first step before a generation of the sequence data stream. The insertion of the buffered identification data image data set in response to the scene record command takes place in a subsequent second step.

Before the actual scene (film scene) is recorded and a corresponding sequence data stream is generated, an identification image data set is therefore first generated that may comprise pieces of information that enable a later identification of this scene. Thus, the identification image data set may, for example, comprise a reproduction of a clapperboard or of an information slate. This identification image data set becomes part of the sequence data stream through the insertion into the subsequently generated sequence data stream. The chronological order of the consecutive frames of a scene recorded in response to the scene record command is encoded in the sequence data stream. The identification image data set is inserted into the sequence data stream generated later such that, with respect to this chronological order, the scene represented by the sequence data stream is preceded by the scene identification image represented by the identification image data set. The identification image data set and the sequence data stream are hereby clearly linked to one another.

In this connection, the expression "in the representation of the sequence data stream" therefore means that the scene identification image appears before the scene on a decoding of the sequence data stream as intended or in accordance with conventions and on a reproduction of the hereby represented frames as intended or in accordance with conventions. Thus, the scene identification image can, for example as part of the post-production, be perceived before the scene on a reproduction on a typical reproduction device (e.g. a monitor).

The closed data stream that is thus generated, that is the sequence data stream including the inserted identification image data set, can be stored as a closed data packet in the sequence memory device, whereby an unfragmented storage of the sequence of frames is possible.

The sequence memory device may be integrated in the motion picture camera. Alternatively, the sequence memory device may also be designed by an external sequence memory device connectable to the motion picture camera, for example, as a recorder that is coupled via cable or is coupled wirelessly. In both cases, the sequence memory device may comprise at least one connection accessible from the outside for one or more exchangeable storage media (for example, removable memory cards) or at least one fixedly installed storage medium (e.g. at least one memory chip). Furthermore, the sequence memory device may also have its own controller for controlling a storage process.

Said buffering of the identification image data set can take place in a buffer memory that is present in the control unit or is connected thereto, in particular in a volatile or a non-volatile buffer memory, e.g. in one or more memory chips.

Said control unit may, for example, comprise an integrated circuit, a microprocessor, a central processing unit (CPU), an application-specific integrated circuit (ASIC) or a field programmable gate array (FPGA).

In accordance with an embodiment, the motion picture camera may have at least a first operating element and a second operating element, wherein an actuation of the first operating element triggers a generation of the identification image record command and an actuation of the second operating element triggers a generation of the scene record command. The first operating element may, for example, be a fixedly assigned button or also a freely assignable key (soft key or virtual button). The second operating element may, for example, be a conventional record button (REC button), in particular a so-called toggle button, wherein a first actuation starts the recording and a subsequent second actuation stops the started recording again. Thus, two mutually different operating elements may be provided, wherein both operating elements are connected to the control unit of the motion picture camera. Alternatively, a single operating element may be provided that is actuated in different ways. For example, a short actuation (e.g. shorter than 1 s) can trigger the scene record command and a long actuation (e.g. longer than 1 s) can trigger the identification image record command. Generally, various types of operating elements may be provided, e.g. push buttons, switches, rotary buttons or slidable buttons.

A possibly present, previously generated, buffered identification image data set may in particular be inserted into the sequence data stream due to the actuation of the second operating element. If such an identification image data set is not present, only the recording of the scene is started on the actuation of the second operating element. It is thereby ensured that the motion picture camera in accordance with the invention can be used like a conventional motion picture camera when a separate recording of a scene identification image is not required. This is, for example, the case if the spatial conditions on the film set allow the clapperboard or the information slate to be held in the recording region for a short time and then removed again.

Alternatively or additionally, the motion picture camera may have a control input via which the identification image record command can be received from outside the motion picture camera and can be transmitted to the control unit of the motion picture camera. Thus, the identification image record command may also be triggered from outside the motion picture camera, for example, by a camera assistant by means of a remote control unit separate from the motion picture camera. Such a remote control unit may be connected to the control input of the motion picture camera in a wireless manner (in particular by radio) or in a wired manner (in particular via cable). The remote control unit may also serve to transmit the scene record command to the motion picture camera, in particular via the same control input as the identification image record command. A remote control unit of said kind is generally known from DE 196 29 484 A1 and WO 2010/046237 A1.

In accordance with a further advantageous embodiment of the invention, the control unit of the motion picture camera is configured to transmit the sequence data stream, including the inserted identification image data set, to the sequence memory device such that the sequence data stream can be stored in a single data packet, in particular in a single file. For this purpose, the sequence data stream is transmitted to the sequence memory device as a closed data stream, in particular a continuous data stream, and is stored in an unfragmented manner. Thus, both the original sequence data stream, which only represents the actual scene, and the inserted identification image data set can be stored in the same data packet and in particular in the same file. Said data packet or said file may, for example, be saved in one of the formats ARRIAW, ProRes, RAW, XAVC, XF-AVC.

The motion picture camera advantageously comprises the sequence memory device, wherein the motion picture camera is configured to store the sequence data stream in a single data packet, in particular in a so-called container file. A container file or a container format is a data structure by which individual data streams of possibly different formats may be combined to form a data stream, for example, to form said container file (multiplexing). Containers generally include data of different formats. Thus, the so-called AVI container is, for example, known that, for example, includes an MPEG-4 video track created with an Xvid codec and an MP3 audio track created with an encoder such as LAME. Some container formats may furthermore include further data such as subtitles, menu structures, or additional audio tracks. The insertion into the container file preferably takes place by means of the control unit and/or the sequence memory device, in particular together with further data or data streams, for example with audio data streams or metadata.

In accordance with a further embodiment, the control unit of the motion picture camera is configured to compress the sequence data stream before or during the storage. In this respect, loss-free or also lossy data compression processes may be used, wherein the data compression may be performed both in the control unit and in the sequence memory device.

In some embodiments, the inserted identification image data set is located at the start of the sequence data stream. It is thereby possible on a post-processing of the recorded sequence data stream to visualize the identification image data set stored therein as quickly as possible in order to ensure a problem-free identification of the recorded scene.

In accordance with an embodiment, the identification image data set represents a single scene identification image. Only a single scene identification image is in particular generated in response to the identification image record command, wherein only a single scene identification image is also inserted into the sequence data stream.

Alternatively, the identification image data set may represent a scene identification sequence comprising a plurality of frames. This scene identification sequence may be composed of a plurality of frames captured in succession or of a plurality of copies of a single frame. The scene sequence is thus either a short motion picture recording or a series of scene identification images that is based on a single scene identification image that was subsequently duplicated. The number of images of the scene identification sequence may in this respect be fixedly predefined or may be changed by a user. The number can, for example, be determined by corresponding settings in a setup menu or also by the duration of an actuation of an operating element that is provided to generate the identification image record command.

In accordance with a further embodiment of the invention, one or more frames present in the original sequence data stream are replaced with the inserted identification image data set, wherein the number of replaced frames may in particular be equal to the number of images of the identification image data set. In some embodiments, the first frame or a plurality of frames present directly at the start of the original sequence data stream are replaced with the identification image data set. The replaced frames are discarded. Since the identification image data set first has to be stored directly after the generation of the scene record command, but the sequence data stream with the scene images is already available for storage at this point in time, the demands on a possibly necessary buffering of the sequence data stream are at least reduced in this design. The replacement of the respective frame with the inserted identification image data set may be performed by the control unit of the motion picture camera.

In accordance with a further embodiment, the control unit may be configured to initiate the generation and storage of the sequence data stream only in response to the scene record command, but not yet in response to the identification image record command.

As soon as an identification image data set has been generated and buffered, this may be signaled to a user of the motion picture camera, for example, by a corresponding symbol in an electronic viewfinder of the motion picture camera and/or by another external visual display that may in particular be provided at the first operating element.

In accordance with a further embodiment, the control unit may be configured to keep the identification image data set stored in the buffer memory until the control unit receives a scene record command. It is thereby ensured that the scene record command does not have to be received directly after the generation and buffering of the identification image data set, but that this may also take place with a time delay.

In accordance with a further embodiment, the control unit may be configured to delete the identification image data set due to the actuation of an associated operating element before the identification image data set is inserted into a subsequently generated sequence data stream. It is hereby avoided that a possibly erroneously generated or no longer required identification image data set is unintentionally inserted into a subsequently generated sequence data stream. Thus, a repeated or also a long-lasting actuation of the above-mentioned first operating element may, for example, delete or overwrite a previously generated and buffered identification image data set. For example, an identification image data set may be recorded on a first actuation of the operating element, the previously recorded identification image data set may be deleted on a second actuation, and a new identification image data set may be recorded on a third actuation. Alternatively, a first short actuation of the operating element may record an identification image data set. A deletion of the previously recorded data set takes place on a second long actuation, while the present identification image data set is overwritten by a new identification image data set on a second short actuation. Alternatively, a third operating element may also be provided as a "delete button" for the identification image data set.

In accordance with a further embodiment, the control unit of the motion picture camera may be configured to control a playback device to reproduce the scene identification image that corresponds to the buffered identification image data set. The user (e.g. a cameraman) can thus in particular assure himself before the triggering of a scene record command that the correct scene identification image is buffered and is available for a subsequent recording of a sequence data stream (corresponding to a motion picture sequence). Said playback device may, for example, be an integrated monitor or an electronic viewfinder of the motion picture camera or an external monitor that is connected to an image signal output of the motion picture camera (in a wireless or wired manner). The triggering of such a reproduction of the scene identification image may in particular take place as a result of a corresponding operating element that is at least indirectly connected to the control unit of the motion picture camera.

The invention also relates, independently of the explained motion picture camera, to a remote control unit for remotely controlling an associated motion picture camera of the explained type, wherein the remote control unit is configured to selectively generate an identification image record command or a scene record command and to transmit it to the associated motion picture camera, wherein the identification image record command includes the instruction to generate an identification image data set that represents at least one scene identification image, and wherein the scene record command includes the instruction to generate a sequence data stream that represents a sequence of consecutive frames. The remote control unit may have an evaluation and control device that is configured to selectively generate the identification image record command or the scene record command. The evaluation and control device may, for example, comprise any kind of integrated circuit or microprocessor. The remote control unit may further have a signal output via which the generated identification image record command and the generated scene record command may be transmitted to the associated motion picture camera. This can take place in a wireless manner (in particular by radio) or in a wired manner (in particular via cable).

Analogously to as explained above for the motion picture camera, such a remote control unit may have a first operating element and a second operating element, wherein an actuation of the first operating element triggers a generation of the identification image record command and a transmission thereof to the motion picture camera, and wherein an actuation of the second operating element triggers a generation of the scene record command and a transmission thereof to the motion picture camera. Alternatively, the remote control unit may also have a single operating element that is actuated in different ways to selectively generate either the identification image record command or the scene record command and to transmit it to the motion picture camera.

The remote control unit may also be configured to remotely control the camera objective, in particular to remotely control a corresponding objective actuating motor (e.g. an adjustment of the focal position, of the focal length, or of the iris aperture opening). In this embodiment, the remote control unit has at least one movable operating element, e.g. an adjustment wheel, for setting objective control commands, wherein the evaluation and control device of the remote control unit is configured to generate corresponding objective control signals in dependence on the set objective control commands and to transmit them to the motion picture camera.

In another respect, the remote control unit may be configured analogously to as explained above for the motion picture camera and as is also described in DE 196 29 484 A1 and WO 2010/046237 A1.

Further advantageous embodiments of the invention result from the dependent claims, from the description, and from the drawings.

Figure 2:
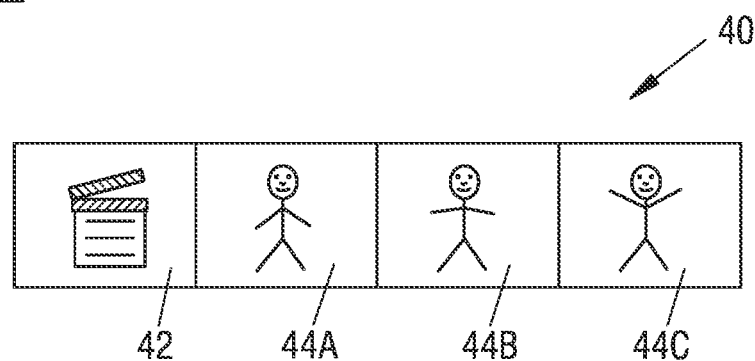

The invention will be described in the following with reference to an embodiment and to the drawings. There are shown:

FIG. 1 a schematic block diagram of a digital motion picture camera in accordance with the invention; and FIG. 2 a schematic representation of a sequence data stream.

FIG. 1 schematically shows a digital motion picture camera 10 having an objective 12 that may be configured as an interchangeable lens or that may be fixedly connected to the motion picture camera 10. The objective 12 images the images to be captured on an image sensor 14 that may, for example, be a CMOS image sensor or a CCD image sensor. The image sensor 14 converts the captured images into electronic image signals and transmits the latter to a control unit 16.

The control unit 16 is configured to receive, process, and transmit the image signals. Furthermore, the control unit 16 is configured to receive control commands from the different components of the motion picture camera 10 and/or to transmit control commands to the components. The control unit 16 may have a modular design. The control unit 16 is connected to a buffer memory 18 in which image data sets, which may comprise a single image or short image sequences, can be buffered, i.e. the control unit can store an image data set in the buffer memory 18 and can also read it out again.

The control unit 16 is furthermore connected to a sequence memory device, here designated as a memory device 24 in short, and to a connection 28 for an external memory device or sequence memory device in order to transmit the image signals in the form of a sequence data stream 40 for storage to the memory device 24 or to an external memory device connected to the connection 28. In the present embodiment, the memory device 24 comprises an exchangeable storage medium 26, for example a solid-state memory. In the case of modifications of the motion picture camera 10, only an internal memory device 24 or only a connection 28 for an external memory device may also be selectively provided.

To monitor and check the images acquired by the image sensor 14, an electronic viewfinder 30 connected to the control unit 16 is provided with an electronic image display apparatus (display).

The control unit 16 is furthermore connected to a first and a second operating element 20, 22 that may be designed as a push button, for example. The first operating element 20 and the second operating element 22 may alternatively or additionally also be provided outside the motion picture camera 10, in particular at an associated remote control unit.

In the following, the mode of operation of the motion picture camera 10 will be explained in more detail with reference to FIGS. 1 and 2.

Before the recording of a scene, an identification image data set is first to be generated that enables a later identification of the subsequently recorded scene. For this purpose, a clapperboard or an information slate is to be captured first on which the information necessary for identifying the next scene is written or displayed.

To generate this identification image data set, a user of the motion picture camera 10 first actuates the first operating element 20, i.e. he exerts a brief key press on the first operating element 20. An identification image record command is hereby triggered that causes the control unit 16 to generate an identification image data set from the image signals of the image sensor 14. In the embodiment, this identification image data set only comprises a single scene identification image 42 that comprises a reproduction of a clapperboard or of an information slate.

In accordance with a modification, a scene identification sequence comprising a plurality of frames may also be captured due to the actuation of the first operating element 20, wherein the length or the number of frames may be fixedly predefined or may be predefined in a user-defined manner. The length of this sequence may, for example, be determined by a corresponding menu entry or by the duration of the actuation of the first operating element 20. It is also conceivable that a first brief actuation of the first operating element 20 starts the capture of the scene identification sequence and a further actuation stops the capture.

The acquired identification image data set having the scene identification image 42 or having the scene identification sequence is transmitted from the control unit 16 to the buffer memory 18 for buffering. Subsequently, the motion picture camera 10 may be configured for the recording of the actual scene, which may, for example, comprise a repositioning of the motion picture camera 10 or a changing of the objective settings (e.g. focal length, focus).

In accordance with a modification, the presence of an identification image data set in the viewfinder 30 and/or of another display apparatus provided at the motion picture camera 10 may be signaled. A signaling in the viewfinder 30 may, for example, take place by a fading in of a corresponding symbol in the image display apparatus.

If the actual scene is now subsequently to be recorded, the motion picture camera 10 or a recording operation of the motion picture camera 10 is activated by actuating the second operating element 22, i.e. a scene record command is transmitted to the control unit 16. After receiving the scene record command, the control unit 16 starts to generate a sequence data stream 40 and to transmit it to the memory device 24 and to the connection 28. In this respect, the scene identification data set having the scene identification image 42 is first transmitted and, directly following this, the frames 44A to 44C of the actual motion picture sequence generated due to the scene record command are transmitted.

As long as the recording operation of the motion picture camera 10 is activated for the capture of the scene, the sequence data stream 40 is stored as a closed data stream on the storage medium 26 and/or is stored in the form of a closed data packet or of a closed file on a storage medium of the external memory device connected to the connection 28.

The recording of the sequence data stream 40 may be ended by a further actuation of the second operating element 22. The data packet or the file is hereby closed. A repeat generation of a scene record command results in a generation of a new data packet or of a new file. An addition of further frames to the already closed file is technically not possible or is at least not permitted in order to enable a distinction of the different scenes.

FIG. 2 accordingly shows, in a chronological order from left to right, first the scene identification image 42 and then the sequence of consecutive individual images 44A to 44C.

In summary, the buffered identification image data set is inserted into a subsequently generated scene sequence data stream such that, in the representation of the sequence data stream 40, the sequence of consecutive frames 44A to 44C is preceded by the scene identification image 42 of the identification image data set (as shown in FIG. 2) and the sequence data stream 40, including the inserted identification image data set, forms a closed data stream.

In this connection, the expression "in the representation of the sequence data stream" means that the scene identification image 42 appears before the scene frames 44A to 44 in time on a decoding of the sequence data stream 40 as intended and on a reproduction of the hereby represented frames 42, 44A to 44C as intended.

The data packet or the file generated by the storage of the sequence data stream 40 may possibly comprise even further data, for example, metadata such as time data or setting data of the camera. These additional data or metadata may be stored at any desired point, in particular also at a plurality of points, in the data packet or in the file, in particular also at the start of the data packet or of the file.

First frames 44A to 44C are already generated directly after the triggering of the scene record command by the actuation of the second operating element. However, the identification image data set first has to be saved at this point in time. To prevent the already generated frames of the motion picture sequence from being lost, an anyway present buffer memory or an additional buffer memory may be used to buffer the motion picture sequence. Alternatively, the already generated frames of the motion picture sequence may be discarded until the identification image data set has been completely inserted into the sequence data stream 40 and stored.

REFERENCE NUMERAL LIST 10 motion picture camera
12 objective
14 image sensor
16 control unit
18 buffer memory
20 first operating element
22 second operating element
24 memory device
26 storage medium
28 connection for an external memory device
30 viewfinder
40 sequence data stream, data packet
42 scene identification image
44A to 44C frame

The invention claimed is:

1. A digital motion picture camera (10), comprising an electronic image sensor (14) for generating image signals; and a control unit (16), wherein the control unit (16) is configured, in response to an identification image record command, to generate an identification image data set in a first step before a generation of a sequence data stream, which represents at least one scene identification image (42) comprising a reproduction of a clapperboard or of an information slate, from the image signals of the image sensor (14) and to buffer the identification image data set in a buffer memory (18), wherein the control unit (16) is configured, in response to a scene record command, to generate the sequence data stream (40) in a subsequent second step, which represents a sequence of consecutive frames (44A-44C) representing a film scene, from the image signals of the image sensor (14) and to transmit the sequence data stream (40) to a sequence memory device (24) in order to store the sequence data stream (40), with the control unit (16) further being configured to insert the buffered identification image data set into the subsequently generated sequence data stream (40) such that, in the representation of the sequence data stream (40), the sequence of consecutive frames (44A-44C) is preceded by the at least one scene identification image (42) of the identification image data set and the sequence data stream (40), including the inserted identification image data set, forms a closed data stream, and wherein the motion picture camera has at least one operating element, wherein an actuation of the at least one operating element triggers a generation of the identification image record command and another actuation of the at least one operating element triggers a generation of the scene record command.

2. A digital motion picture camera (10) in accordance with claim 1, wherein the at least one operating element of the motion picture camera (10) comprises at least a first operating element (20) and a second operating element (22), wherein an actuation of the first operating element (20) triggers a generation of the identification image record command and an actuation of the second operating element (22) triggers a generation of the scene record command.

3. A digital motion picture camera (10) in accordance with claim 1, wherein the motion picture camera (10) has a control input that is configured to receive the identification image record command.

4. A digital motion picture camera (10) in accordance with claim 1, wherein the control unit (16) is configured to transmit the sequence data stream (40), including the inserted identification image data set, to the sequence memory device (24) such that the sequence data stream (40), including the inserted identification image data set, can be stored in a single data packet.

5. A digital motion picture camera (10) in accordance with claim 1,
wherein the motion picture camera (10) comprises the sequence memory device (24), wherein the motion picture camera (10) is configured to store the sequence data stream (40), including the inserted identification image data set, in a single data packet.

6. A digital motion picture camera (10) in accordance with claim 1,
wherein the control unit (16) is configured to compress the sequence data stream (40) before or during storage.

7. A digital motion picture camera (10) in accordance with claim 1,
wherein the inserted identification image data set is located at a start of the sequence data stream (40).

8. A digital motion picture camera (10) in accordance with claim 1,
wherein the identification image data set represents a single scene identification image (42).

9. A digital motion picture camera (10) in accordance with claim 1,
wherein the identification image data set represents a scene identification sequence comprising a plurality of frames.

10. A digital motion picture camera (10) in accordance with claim 9,
wherein the scene identification sequence is composed of a plurality of frames captured in succession or of a plurality of copies of a single frame.

11. A digital motion picture camera (10) in accordance with claim 1,
wherein one or more frames (44A-44C) present in the originally generated sequence data stream (40) are replaced with the inserted identification image data set.

12. A digital motion picture camera (10) in accordance with claim 1,
wherein the control unit (16) is configured to keep the identification image data set stored in the buffer memory (18) until the control unit (16) receives a scene record command.

13. A digital motion picture camera (10) in accordance with claim 1,
wherein the control unit (16) is configured to delete the identification image data set from the buffer memory (18) after the insertion into the sequence data stream (40).

14. A digital motion picture camera (10) in accordance with claim 1,
wherein the control unit (16) is configured to delete the identification image data set due to an actuation of an associated operating element (20) before the identification image data set is inserted into a subsequently generated sequence data stream (40).

* * * * *